C. C. BAUM.
Wheel-Cultivator.

No. 51,682. Patented Dec. 26, 1865.

UNITED STATES PATENT OFFICE.

C. C. BAUM, OF OXFORD, IOWA.

IMPROVEMENT IN CULTIVATOR-PLOWS.

Specification forming part of Letters Patent No. 51,682, dated December 26, 1865.

*To all whom it may concern:*

Be it known that I, C. C. BAUM, of Oxford, in the county of Johnson and State of Iowa, have invented a new and Improved Cultivator-Plow; and I do hereby declare that the following is a full, clear, and exact description thereof, which will enable others skilled in the art to make and use the same, reference being had to the accompanying drawings, forming part of this specification.

This invention relates to a new and improved cultivator-plow; and it consists in a novel construction and arrangement of the parts, as hereinafter fully shown and described, whereby the device is placed under the complete control of the operator and the plows rendered capable of being very readily manipulated, so as to conform to the sinuosities of the rows of plants, and to plow at a greater or less distance from them, as may be required.

Figure 1:
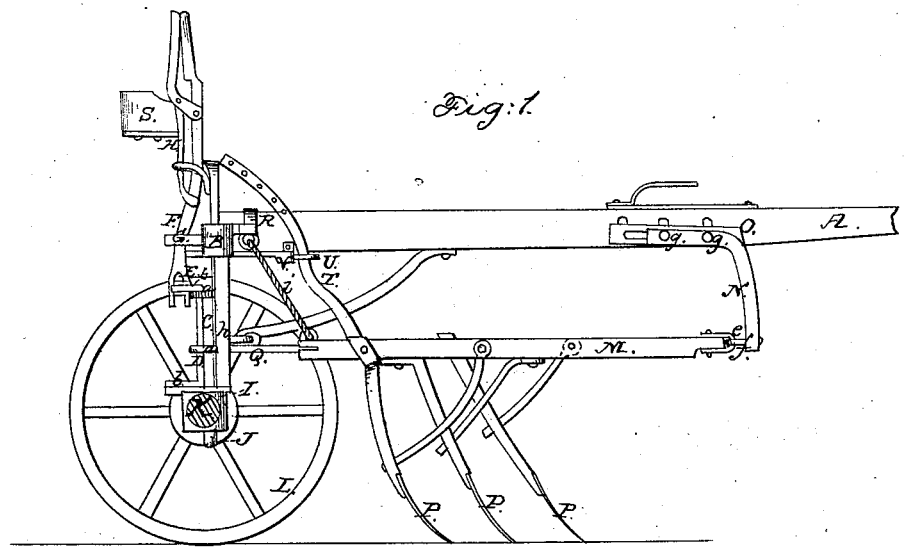
Figure 2:
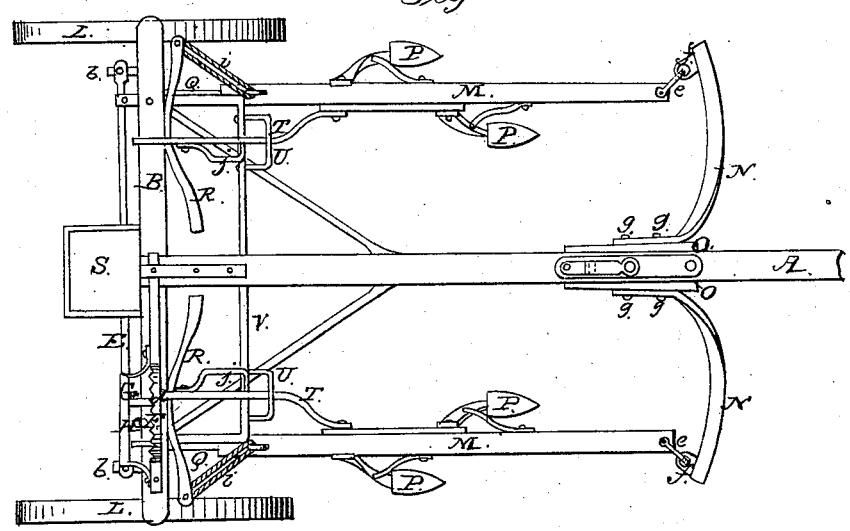

In the accompanying drawings, Figure 1 is a side view of my invention; Fig. 2, a plan or top view of the same.

Similar letters of reference indicate like parts.

A represents a draft-pole, the rear end of which is framed at right angles into a cross-piece, B. This cross-piece B has pendent bars C bolted to it, one near each end, the rear sides of said bars having eyes or bearings *a* attached, in which rods D are fitted and allowed to turn freely. The rods D are provided with cranks *b* at their upper and lower ends, the cranks of each rod being in line with each other, and the upper cranks connected by a bar, E, which has the lower end of a lever, F, attached to it, the fulcrum-pin of which passes through the cross-piece B. The lever F passes through a guide, G, and is secured at any point within the scope of its movement by means of a notched bar, *d*, at one side of the guide and a sliding bar, H, attached to the lever. The lower cranks, *b*, of the rods D are attached to the outer parts of heads I, which are fitted loosely on pendent arbors J at the lower ends of the bars C, said heads I having the axles K of the wheels L attached to them.

From this description it will be seen that the wheels L may be turned or cramped by actuating the lever F, and the device consequently guided with the greatest facility, the plows made to conform to the sinuosities of the rows of plants, and the machine kept in proper place or position on side hills.

M M represent two plow-beams, the front ends of which are connected, by links *e* and eyes *f*, to the lower ends of curved bars N N, the upper ends of which are attached to the draft-pole A by bolts *g*. Between the bars N N and the draft-pole there are interposed wedges O, by adjusting which the front ends of the plow-beams may be brought nearer together or farther apart, as may be desired, the wedges being slotted longitudinally for the bolts *g* to pass through.

The plow-beams M have each three plows, P, attached, one plow being a little in advance of the other, and to the rear end of each beam there is attached a rod, Q. These rods are fitted between the pendent bars C and bars *h*, by the side of the same, said bars serving as guides.

The rear parts of the plow-beams are connected by chains or cords *i* to levers R, which are attached to the front side of the cross-piece B at such points as to admit of being readily operated by the feet of the driver when on his seat S, and to each plow-beam there is secured a bar, T. These bars pass up through guides U at the front side of a bar, V, attached to the front side of the cross-piece B, each bar T having a stirrup, *j*, secured to it to receive the feet of the driver.

In order to raise the plows out of the ground the driver actuates the levers R with his feet, and by actuating the bars T laterally the plows P may be turned or moved toward the right or left, as may be required.

Thus it will be seen that the plows are under the complete control of the operator, and, in fact, the whole machine, as the plows may be adjusted with the greatest facility either laterally or vertically and the machine guided or turned quickly by actuating the wheels L, as described.

Having thus described my invention, I claim as new and desire to secure by Letters Patent—

The combination of the bars C, vertical shafts D, cranks *b b*, connecting-rod E, lever F, heads I, and axles K, as and for the purposes set forth.

C. C. BAUM.

Witnesses:
STEPHEN LUSE,
JOHN LUSE.